United States Patent
Puranik et al.

(10) Patent No.: US 6,859,838 B1
(45) Date of Patent: Feb. 22, 2005

(54) MEDIA PLAYER WITH PROGRAMMABLE PLAYLISTS

(75) Inventors: Rajiv Puranik, San Jose, CA (US); Hemant Gokhale, Redwood City, CA (US); James Lenigk, Oakland, CA (US)

(73) Assignee: ON24, Inc., San Francisco, CA (US)

( * ) Notice: Subject to any disclaimer, the term of this patent is extended or adjusted under 35 U.S.C. 154(b) by 0 days.

(21) Appl. No.: 09/565,672

(22) Filed: May 4, 2000

(51) Int. Cl.[7] .............................................. G06F 15/16
(52) U.S. Cl. ...................... 709/231; 709/232; 709/203; 709/218; 709/219; 345/722; 345/723; 345/716
(58) Field of Search ................................ 709/203, 100, 709/231–232, 218–219, 226–228; 725/43, 12, 134, 142, 89, 63, 100; 345/716, 722, 723

(56) References Cited

U.S. PATENT DOCUMENTS

| | | |
|---|---|---|
| 5,220,665 A | 6/1993 | Coyle, Jr. |
| 5,861,906 A | 1/1999 | Dunn |
| 5,892,915 A * | 4/1999 | Duso et al. ................. 709/219 |
| 5,929,850 A | 7/1999 | Broadwin |
| 5,996,015 A | 11/1999 | Day |
| 6,014,706 A | 1/2000 | Cannon |
| 6,058,424 A | 5/2000 | Dixon |
| 6,097,441 A | 8/2000 | Allport |
| 6,157,809 A | 12/2000 | Kambayashi |
| 6,452,609 B1 * | 9/2002 | Katinsky et al. ............ 345/716 |
| 6,538,665 B2 * | 3/2003 | Crow et al. ................. 345/723 |

* cited by examiner

*Primary Examiner*—Jack B. Harvey
*Assistant Examiner*—Hien Le
(74) *Attorney, Agent, or Firm*—Gray Cary Ware & Freidenrich, LLP

(57) ABSTRACT

An internet-based personalizable broadcast network for viewing information in the form of streaming audio and/or video. The network includes an input for receiving streaming media content, organized into a plurality of news channels. The network includes some type of media server for playing the received streaming media content as a presentation to a user. The network further includes storage for an array of cursors. At least some of the plurality of news channels have at least one associated cursor in the array of cursors and an associated cursor indicates where, in the news channel associated with that associated cursor, the presentation of the news channel stopped. Logic is provided for updating the array of cursors as news channels are provided to the user thereby allowing the user to limit repetition of news channels, or portions of news channels, already presented to the user.

12 Claims, 2 Drawing Sheets

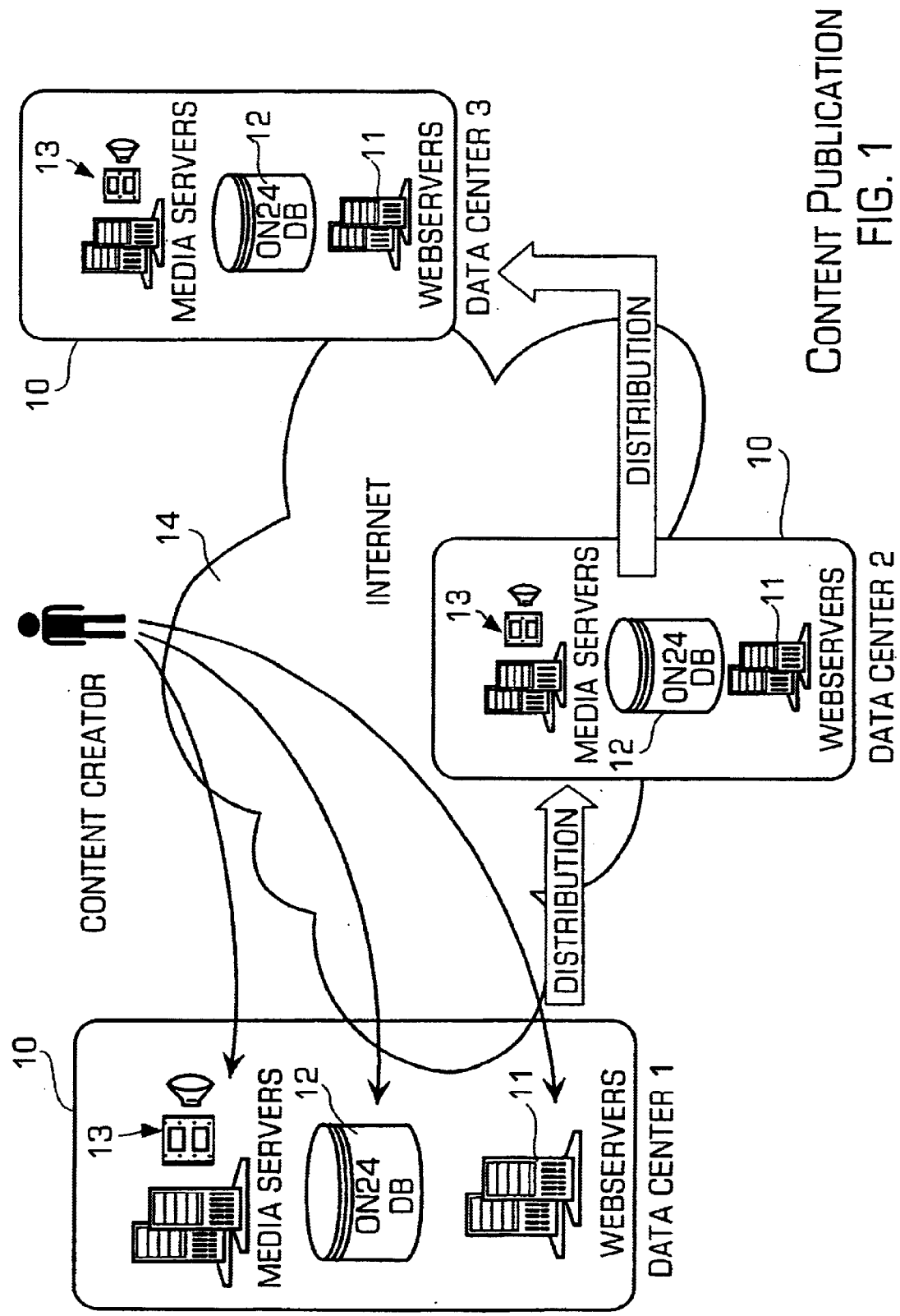

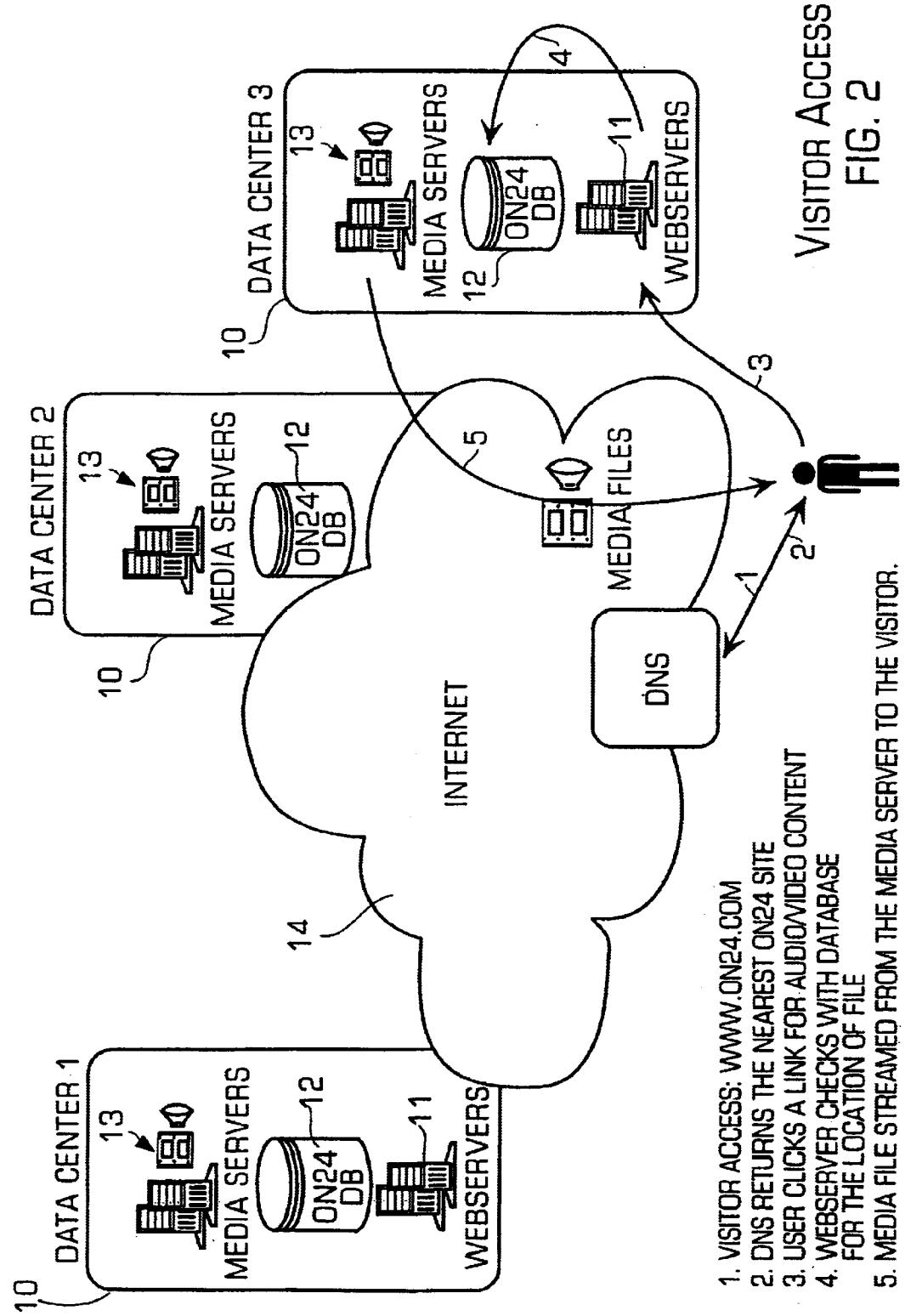

MEDIA PLAYER WITH PROGRAMMABLE PLAYLISTS

BACKGROUND OF THE INVENTION

1. Field of the Invention

The present invention relates to a personalizable broadcast information network, and more particularly, to an internet-based personalizable broadcast network for viewing information in streaming audio and/or video.

2. Description of the Prior Art

Various networks currently provide large amounts of information on numerous subjects. For example, radio and television networks broadcast general news, sports, investment news, entertainment news, etc. Generally, if one is interested in a particular subject, one may tune in to specialized stations that deal specifically with the topic in which they are interested.

The internet has recently become a large network that provides all kinds of information to users. The information may be provided in web page format, streaming audio and video, and e-mail.

Often, with streaming audio and video files, one may wish to stop listening and/or viewing particular files, move to another streaming audio or video file, a different web page, or leave the internet altogether. If a user so desires, he may wish to rejoin the original streaming audio and video file, but rather than start all over again, pick up where the user initially stopped.

SUMMARY OF THE INVENTION

In accordance with the present invention, a streaming media broadcast client includes input for receiving streaming media content, organizing into a plurality of content units, the ability to play the received streaming media content as a presentation to a user, storage for an array of cursors or pointers, and logic for updating the array of cursors. At least some of the plurality of content units have at least one associated cursor in the array of cursors and an associated cursor indicates where, in the content unit associated with that associated cursor, a presentation of the content unit stopped. The logic for updating the array of cursors does so as content units are presented to the user thereby allowing the user to limit repetition of content units, or portions of content units, already presented to the user.

Content units, such as individual information items or "stories," are categorized into channels or playlists and may belong to one or more playlists or channels. Some of the channels may be programmed by an information provider while others may be programmed by a user as the user is attempting to receive information from the information provider based on individual interests. The cursors are maintained in each channel so that users may switch back and forth between channels. Additionally, a history of which individual content units were played is maintained by the cursors so that the same content unit is not played multiple times when it is categorized in multiple channels of user interest.

In accordance with one aspect of the present invention, the storage for the array of cursors is a persistent storage such that the positions of the cursors and the array of cursors are preserved across user sessions.

In accordance with another aspect of the present invention, the array of cursors, includes for at least some content units, a plurality of cursors for each content unit, thereby allowing for a plurality of portions of the content unit to be marked as presented or unpresented.

In accordance with yet another aspect of the present invention, the streaming media broadcast client includes logic for marking content units as being presented, even if the content units were not presented, when a predetermined expiration time for the content units is reached.

In accordance with a further aspect of the present invention, the input is coupled, directly or indirectly, to a streaming media server to receive content units as the content units are needed to present to the user.

In accordance with yet another aspect of the present invention, the streaming media broadcast client further includes logic for presenting to the user content units in a predefined order, omitting content units, or portions of content units, that the array of cursors indicate have already been presented.

In accordance with a further aspect of the present invention, the logic for presenting includes logic for presenting a plurality of content units to the user in a serial presentation without requiring user interaction during the serial presentation.

Thus, the present invention provides a streaming media broadcast system that delivers information over the internet in real-time. The system indexes and hosts the content on a high-availability, high-bandwidth network of web media and delivery servers. The system includes an interface such that users may view contents one at a time of as a multiple-item list. The interface has the intelligence to identify registered users that filter out only the content that is of interest to them and which has not been previously viewed by them.

Other features and advantages of the present invention will be understood upon reading and understanding the detailed description of the preferred exemplary embodiments, found hereinbelow, in conjunction with reference to the drawings, in which like numerals represent like elements.

BRIEF DESCRIPTION OF THE DRAWINGS

FIG. 1 is a schematic diagram illustrating a network view of how content published and distributed among multiple data users; and FIG. 2 illustrates how visitors interact with the network illustrated in FIG. 1.

DETAILED DESCRIPTION OF THE PREFERRED EXEMPLARY EMBODIMENTS

A system in accordance with the present invention includes at least one data center 10 made up of web servers 11, a database 12, and media servers 13. Preferably, multiple data centers 10 are provided to provide back-up, in case of system failure, and capacity so that the number of users does not adversely effect the system's ability to operate. The system includes a central web site that is in communication with all data centers via a network 14, preferably the internet.

Audio-video content is gathered or received from multiple sources. Regardless of the source and method of delivery to the database, i.e., homegrown, electronic transfer, telephone, media tapes, etc., the incoming raw content is edited and encoded into one or more of supported media player formats. In some cases, additional files such as macromedia/animated GIFs (graphics) and SMIL (synchronized multimedia instructions) are bundled with the audio/video media files.

Once the submitted and gathered content is registered in a central database, based upon the information available about the content (for example, company name, publication date, content categories, as well as the formats available), it is indexed into multiple classifications that may be referred to as (news) channels or content units. Generally, these channels will overlap and thus, a particular channel's content may be classified in multiple channels. For example, a company going public may be filed under its ticker, based upon the company name, as well as an "IPO" channel.

As the content is indexed, the related streaming media (audio/video) files are copied to application-specific media servers (for example, Real Server for Real Networks format content, and Windows media server for Microsoft Windows media format). Content is preferably hosted on multiple load-balanced geographically dispersed servers for high-availability and proximity to viewers.

Once a content is indexed in the database, and its related media files are copied to servers, the content is made visible. This is preferably done in one or more forms, for example, URL (links) on a central web site, URL (links) on affiliates' sites, and e-mail to registered users, preferably filtered by user channel interest.

Preferably, the central web site and the overall database include a server side program that is triggered in response to changes to the database in order to publish new/modified content to the central web site as HTML pages. Additionally, preferably the central web site has a syndication server that packages links to content for delivery to affiliate sites using e-mail or ftp, and in some cases subdirectories on the central database and web site to be "spidered" by affiliates. In turn, the affiliates process the "feed" and generate links to the central web site on their own site.

Preferably, the system includes a personalized e-mail service to send notifications of new content to registered users. The e-mail combines personalization, i.e., desired channels, with editorial selections of news-of-the-day.

When a user clicks a URL link to the central web site's content, it preferably launches a branded HTML window player then embeds the user's choice of media player and loads the content in the correct format from the media server. This is referred to as a "single content play" mode.

In addition, if the user is a registered user (preferably identifiable using a user cookie), the HTML window player searches the database for the user's channels of interest. A personalized playlist is built using a registered user's preferences listed with the central web site and is presented to the user for a very personalized experience.

Additionally, the database includes an array of cursors that indicate where the user last accessed the channel(s). Thus, the user will begin viewing the content of the channel at the point at which it was last accessed by the user. Storage is provided for the array of cursors and preferably, the storage is a persistent storage such that the positions of the cursors and the array of cursors are preserved across user sessions.

Additionally, in accordance with one embodiment of the present invention, the array of cursors includes, for at least some of the channels, a plurality of cursors for each channel thereby allowing for a plurality of portions of the channel to be marked as presented or unpresented. Thus, the user may have the option of selecting which portions of the unviewed channel they wish to view. Preferably, logic within the database is included for marking content within the channels as presented even if the content had not been presented to the user after a predetermined expiration of time has been achieved. This is useful in the instances when information within the channels may become old or "stale," thus being generally uninteresting to a user.

Furthermore, the system also includes logic for updating the array of cursors as channels are presented to the user thereby allowing the user to either limit repetition of content within the channels or portions of the channels already presented to the user.

In accordance with another embodiment of the present invention, logic is provided for presenting to the user channels in a predefined order, omitting content within the channels or portions of the channels that the array of cursors indicate have already been presented. In accordance with a preferred embodiment, the logic for presenting the content of the channels includes logic for presenting a plurality of channels to the user in a serial presentation without requiring user interaction during the serial presentation.

Appendix A includes an example of source code for implementing the present invention.

Thus, it can be seen that content is received or gathered by the web site and its database(s). The raw content of the information is edited and encoded to be converted into one or more of supported media formats. Once the gathered information has been so encoded, the information is made available at at least one data center serviced by web servers. Preferably, multiple data centers are provided and are in communication with one another, preferably via the internet, for receiving, converting, and supplying information to users. Such a network has architecture that consists of farms of highly tuned, special purpose servers in multiple data centers that are located at co-location facilities to guarantee reliability, bandwidth availability and physical security. Such a system includes no single point of failure since every server has a back-up or is replicated to ensure complete operation even if a failure can temporarily reduce the capacity of the network. Users are notified of new or available content through a variety of forms. The user accesses the central web site and DNS returns the nearest central web site's data center. The user clicks a length for user/audio content and the web server checks with the database for the location of the file. Based on the array of cursors and the logic within the system, the selected media file is streamed from the media server to the visitor based upon previously presented content or portions of the selected media file.

Although the invention has been described with reference to specific exemplary embodiments, it will appreciated that it is intended to cover all modifications and equivalents within the scope of the appended claims.

What is claimed is:

1. A streaming media broadcast client, comprising:
   an input for receiving streaming media content, organized into a plurality of content units;
   a means for playing the received streaming media content as a presentation to a user;
   storage for an array of cursors, wherein at least some of the plurality of content units have at least one associated cursor in the array of cursors and an associated cursor indicate where, in the content unit associated with that associated cursor, a presentation of the content unit stopped; and
   logic for updating the array of cursors as content units are presented to the user, thereby allowing the user to limit repetition of content units, or portions of content units, already presented to the user and wherein the array of cursors includes, for at least some content units, a plurality of cursors for each content unit, thereby allowing for a plurality of portions of the content unit to be marked as presented or unpresented.

2. The streaming media broadcast client of claim 1, wherein the storage for the array of cursors is a persistent storage, such that the positions of the cursors in the array of cursors are preserved across user sessions.

3. A streaming media broadcast client, comprising:

an input for receiving streaming media content, organized into a plurality of content units;

a means for playing the received streaming media content as a presentation to a user;

storage for an array of cursors, wherein at least some of the plurality of content units have at least one associated cursor in the array of cursors and an associated cursor indicates where, in the content unit associated with that associated cursor, a presentation of the content unit stopped;

logic for updating the array of cursors as content units are presented to the user, thereby allowing the user to limit repetition of content units, or portions of content units, already presented to the user; and logic for marking content units as being presented, even if the content units were not presented, when a predetermined expiration time for the content units is reached.

4. The streaming media broadcast client of claim 3, wherein the input is coupled, directly or indirectly, to a streaming media server to receive content units as the content units are needed to present to the user.

5. The streaming media broadcast client of claim 3, further including logic for presenting to the user content units in a predefined order, omitting content units, or portions of content units, that the array of cursors indicate have already been presented.

6. The streaming media broadcast client of claim 5, wherein the logic for presenting includes logic for presenting a plurality of content units to the user in a serial presentation without requiring user interaction during the serial presentation.

7. A streaming media broadcast method, comprising:

storing streaming media content, organized into a plurality of content units;

storing an array of cursors;

associating one or more cursors in the array of cursors with one or more content units wherein the associated cursor indicates where, in the content unit associated with that associated cursor, a presentation of the content unit stopped and wherein the association of the cursors further comprises, for at least some content units, associating a plurality of cursors for each content unit, thereby allowing for a plurality of portions of the content unit to be marked as presented or unpresented; and updating the array of cursors as content units are presented to the user, thereby allowing the user to limit repetition of content units, or portions of content units, already presented to the user.

8. The method of claim 7, wherein the storage the array of cursors further comprising storing the array of cursors in a persistent storage so that the positions of the cursors in the content units stored in the array of cursors are preserved across user sessions.

9. A streaming media broadcast method, comprising:

storing streaming media content, organized into a plurality of content units;

storing an array of cursors;

associating one or more cursors in the array of cursors with one or more content units wherein the associated cursor indicates where, in the content unit associated with that associated cursor, a presentation of the content unit stopped;

updating the array of cursors as content units are presented to the user, thereby allowing the user to limit repetition of content units, or portions of content units, already presented to the user; and marking a content unit as being presented when a predetermined expiration time for the content units is reached.

10. The method of claim 9 further comprising receiving content units from a streaming media server to receive content units as the content units are needed to present to the user.

11. The method of claim 9 further comprising presenting the content units to a user in a predefined order, omitting content units, or portions of content units, that the array of cursors indicate have already been presented.

12. The method of claim 11, wherein presenting the content units further comprises presenting a plurality of content units to the user in a serial presentation without requiring user interaction during the serial presentation.

* * * * *